United States Patent
Merat et al.

(10) Patent No.: US 11,773,916 B2
(45) Date of Patent: Oct. 3, 2023

(54) CLUTCH ASSEMBLY HAVING AN ELECTROMAGNETIC FRICTION CLUTCH AND A DYNAMIC CONTROLLABLE CLUTCH

(71) Applicant: Means Industries, Inc., Saginaw, MI (US)

(72) Inventors: Ali Merat, Fenton, MI (US); Kenneth Gerard Walega, Northville, MI (US); Spencer J. Kane, Chesaning, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 17/371,638

(22) Filed: Jul. 9, 2021

(65) Prior Publication Data
US 2022/0042553 A1 Feb. 10, 2022

Related U.S. Application Data (60) Provisional application No. 63/061,398, filed on Aug. 5, 2020.

(51) Int. Cl.
*F16D 21/00* (2006.01)
*F16D 13/52* (2006.01)
(Continued)

(52) U.S. Cl.
CPC .............. *F16D 13/52* (2013.01); *F16D 11/14* (2013.01); *F16D 21/00* (2013.01); *F16D 23/025* (2013.01); *F16D 27/115* (2013.01)

(58) Field of Classification Search
CPC .......... F16D 13/52; F16D 11/14; F16D 23/02; F16D 21/00; F16D 27/115; F16D 11/16; F16D 27/02; F16D 2500/10493
See application file for complete search history.

(56) References Cited

U.S. PATENT DOCUMENTS

| 2,950,795 A | * | 8/1960 | Fischer | .................... F16D 27/02 |
| | | | | 192/84.91 |
| 2004/0055844 A1 | * | 3/2004 | Ebenhoch | ........... F16H 63/3026 |
| | | | | 192/53.32 |

(Continued)

FOREIGN PATENT DOCUMENTS

| DE | 102009045562 A1 | * | 4/2011 | ............. F16D 23/04 |
| DE | 102009047766 A1 | * | 6/2011 | ........... F16D 25/061 |

(Continued)

OTHER PUBLICATIONS

Machine translation of DE-102009047766-A1 (Year: 2022).*

(Continued)

*Primary Examiner* — Stacey A Fluhart
(74) *Attorney, Agent, or Firm* — Burgess Law Office, PLLC (57) ABSTRACT

A clutch assembly includes a first clutch having a first translator and a friction pack and a second clutch having first and second coupling members, a locking element, and a second translator. The friction pack includes a first plate fixed to the first coupling member and a second plate fixed to the second coupling member. The first translator of the first clutch is movable to an actuated position in which the plates of the friction pack are engaged with one another thereby causing angular velocities of the first and second coupling members to be synchronized. The second translator of the second clutch is movable to an extended position in which the locking element engages the first and second coupling members with one another thereby causing a power flow path through the first and second coupling members.

20 Claims, 5 Drawing Sheets

(51) Int. Cl.
    *F16D 23/02*     (2006.01)
    *F16D 11/14*     (2006.01)
    *F16D 27/115*     (2006.01)

(56) References Cited

U.S. PATENT DOCUMENTS

2017/0138414 A1*   5/2017   Cioc  ........................ F16D 27/09
2021/0245728 A1*   8/2021   Campbell  .............. B60K 6/387

FOREIGN PATENT DOCUMENTS

DE     102018213275 A1 *   2/2020   ............. F16D 27/00
EP     1628026 A2 *   2/2006   ............. F16D 11/10

OTHER PUBLICATIONS

Definition of Stator, retrieved from www.collinsdictionary.com (Year: 2022).*

Machine translation of DE102018213275, retrieved from eee.espacenet.com (Year: 2023).*

\* cited by examiner

CLUTCH ASSEMBLY HAVING AN ELECTROMAGNETIC FRICTION CLUTCH AND A DYNAMIC CONTROLLABLE CLUTCH

CROSS-REFERENCE TO RELATED APPLICATIONS

This application claims the benefit of U.S. Provisional Application No. 63/061,398, filed Aug. 5, 2020, the disclosure of which is hereby incorporated in its entirety by reference herein.

TECHNICAL FIELD

The present invention relates to automotive clutch devices and methods for controlling and operating such clutch devices.

BACKGROUND

A one-way clutch ("OWC") includes a first coupling (clutch) member, a second coupling member, and at least one locking element. The locking element is movable between (i) an engaged position in which the locking element extends out from the first coupling member and engages the second coupling member and (ii) a disengaged position in which the locking element does not extend from the first coupling member and does not engage the second coupling member. When the locking element is deployed and engages the second coupling member, the OWC locks in one direction of rotation but has free rotation in the opposite direction.

A selectable OWC (also known as a two-way clutch) adds a second set of locking elements in combination with a selector plate. The second locking elements plus the selector plate adds multiple functions to the OWC. A selectable OWC ("SOWC") can produce a mechanical connection between rotating or stationary components in one or both directions and can overrun in one or both directions. The selector plate is adjustable between different positions to implement the different operating modes.

A dynamic controllable clutch (or dynamic selectable clutch) ("DCC") includes a first coupling member in the form of a pocket plate, a second coupling member in the form of a notch plate, and first and/or second sets of locking elements for clockwise ("CW") and/or counterclockwise ("CCW") engagement, respectively. The pocket and notch plates are to be connected to respective power flow components. During engagement, one set of locking elements concurrently engage pocket and notch engagement faces of the pocket and notch plates which thereby connects the pocket and notch plates together. Consequently, in the locked direction of rotation, the DCC can transmit torque between the power flow components which are connected together via the connected pocket and notch plates.

The DCC further includes an actuation system in the form of a linear electric motor ("linear actuator"). The linear actuator includes a stator and a translator. The stator is fixed in position and the translator is fixedly connected to the pocket plate to rotate therewith. The translator is linearly movable between (i) an extended position in which plungers of the translator actuate the locking elements into the engaged position and (ii) a retracted position in which the plungers of the translator allow the locking elements to move to the disengaged position.

The DCC packages in dynamic clutch positions where typically dog clutches, synchronizers, and wet friction clutch packs would be located. Using electric actuation, the DCC eliminates the need for complex hydraulic systems and creates substantial packaging and system efficiency benefits. The DCC can deliver high torques and does not require continuous supply of electric power to stay engaged for torque delivery. However, the DCC can only be engaged at zero or relatively low differential speeds.

An electromagnetic clutch ("EM clutch") operates electrically but transmits torque mechanically. An EM clutch includes an electromagnet, a rotor, an armature, and an output hub. The rotor is to be connected to an input power flow component. The armature is connected to the output hub which is to be connected to an output power flow component. The EM clutch is actuated by applying electrical current to the stator coil of the electromagnet which thereby produces a magnetic field. The rotor becomes magnetized and sets up a magnetic loop that attracts the armature. The armature is pulled against the rotor and a frictional force is generated at contact. The friction between the rotor and armature causes the armature to rotate with the rotor at the same speed. Within a relatively short period of time, the output hub is accelerated to match the speed of the rotor. When the electrical current is removed, the rotor and the armature are rotatable independently of one another.

Currently available EM clutches, whether they may be single-plate or multi-plate, have drawbacks. Although dry EM clutches can deliver high torques, they are extremely hard to control for speed synchronization. Dry EM clutches cannot provide a linear response for dynamic torque. The friction faces of dry EM clutches wear fast and are dirty due to accumulation of worn metal particles. Dry EM clutches are noisy, loud, and audible. Wet EM clutches are limited to relatively low torque capacity systems. All EM clutches require continuous supply of electric power to stay engaged for torque delivery.

Wet multi-plate clutch packs can deliver high torques but require hydraulic loops and continuous supply of power through hydraulic fluid pressure to stay engaged for torque delivery.

Other clutch devices depend on hydraulic actuation systems, which utilize pumps, piping, constant supply, a significant power consumption, and an undesirably slow response time.

SUMMARY

An object of the present invention is a clutch assembly having an electromagnetic friction clutch ("EFC") and a dynamic controllable clutch ("DCC").

The EFC is an electromagnetic clutch which uses a friction surface to engage input and output members of the clutch and is derived based on the conversion of a hydraulically actuated, multi-plate, wet friction clutch into an electromagnetic actuation. The rest of the clutch assembly is based on the integration of the EFC with the DCC.

In carrying out at least one of the above and/or other objects, a clutch assembly having a first clutch (e.g., an EFC) and a second clutch (e.g., a DCC) is provided. The first clutch has a first translator and a friction pack. The second clutch has a first coupling member (e.g., a pocket plate), a second coupling members (e.g., a notch plate), a locking element, and a second translator. The friction pack includes a first plate fixed to the first coupling member and a second plate fixed to the second coupling member. The first translator of the first clutch is movable to an actuated position in which the plates of the friction pack are engaged with one another thereby causing angular velocities of the first and second coupling members to be synchronized. The second translator of the second clutch is movable to an extended position in which the locking element engages the first and second coupling members with one another thereby causing a power flow path through the first and second coupling members.

The second translator of the second clutch is to be moved to the extended position upon the angular velocities of the first and second coupling members being synchronized.

The first translator of the first clutch is further movable to an unactuated position in which the plates of the friction pack are disengaged with one another. The first translator of the first clutch is to be moved to the unactuated position upon the second translator being moved to the extended position.

The second translator of the second clutch is further movable to a retracted position in which the locking element does not engage the first and second coupling members with one another whereby the power flow path is absent. The second translator of the second clutch is to be moved to the retracted position while the angular velocities of the first and second coupling members are not synchronized.

A second power flow path extends through the friction pack while the plates of the friction pack are engaged. The second power flow path is for carrying dynamic torque while the angular velocities of the first and second coupling members are being synchronized.

The power flow path through the first and second coupling members is for carrying steady-state torque between the first and second coupling members after the angular velocities of the first and second coupling members have been synchronized.

The first translator of the first clutch is electromagnetically operable to move to the actuated position and the second translator of the second clutch is electromagnetically operable to move to the extended position.

Further, in carrying out at least one of the above and/or other objects, a system having the clutch assembly and first and second power flow components is also provided. In this case, the first plate of the friction pack is further fixed to the first power flow component and the second plate of the friction plate is further fixed to the second power flow component; and the first coupling member is further fixed to the second power flow component and the second coupling member is further fixed to the first power flow component. Moving the first translator of the first clutch to the actuated position causes a first power flow path through the first power flow component, the friction pack, and the second power flow component and angular velocities of the first and second coupling members to be synchronized. Moving the second translator of the second clutch to the extended position causes a second power flow path through the second power flow component, the first coupling member, the second coupling member, and the first power flow component.

The first power flow path is for carrying dynamic torque between the first and second power flow components while the angular velocities of the first and second coupling members are being synchronized.

The second power flow path is for carrying steady-state torque between the first and second power flow components after the angular velocities of the first and second coupling members have been synchronized.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
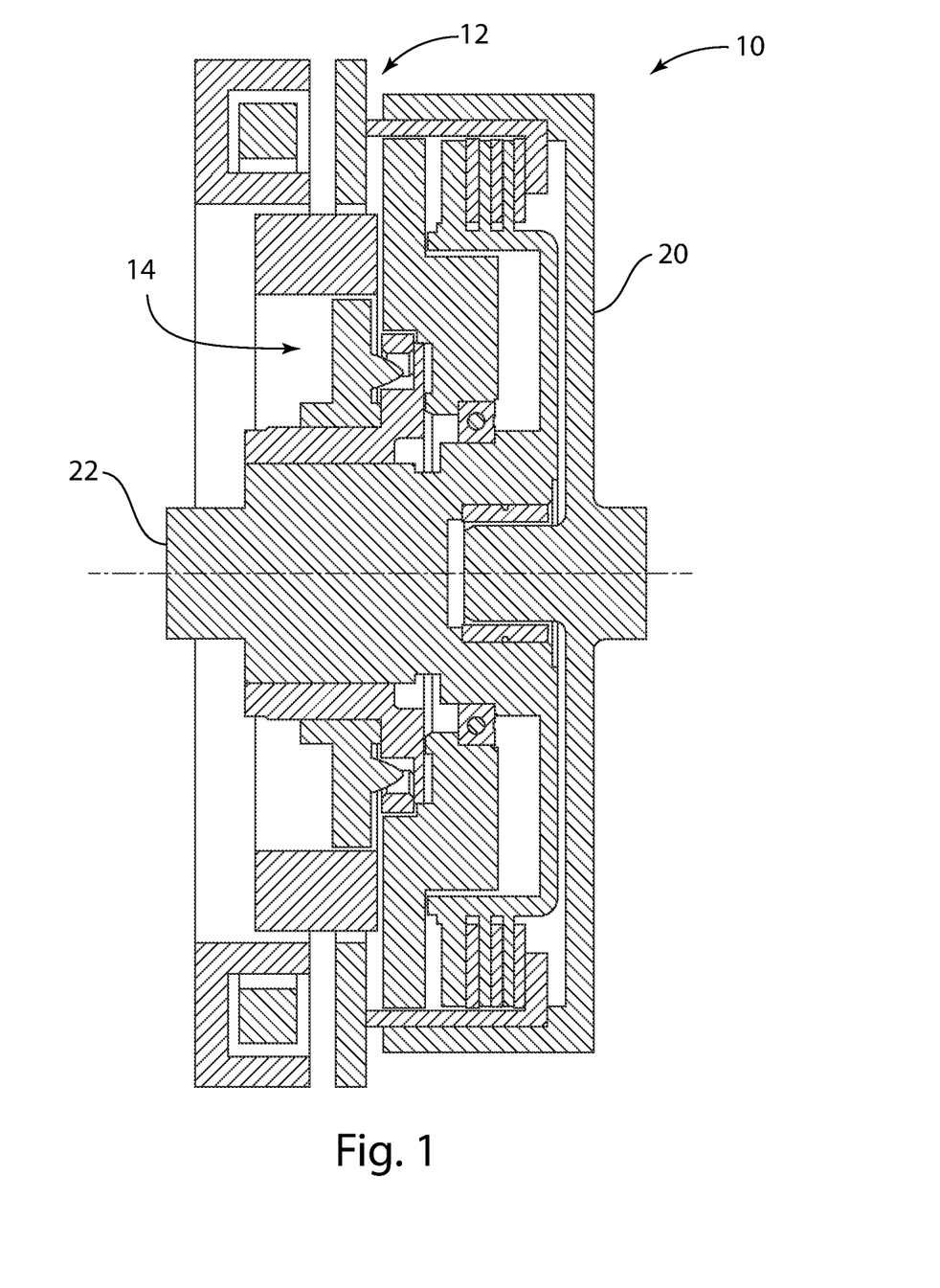
FIG. 1 illustrates a cross-sectional view of a one-half model of a clutch assembly having an electromagnetic friction clutch ("EFC") and a dynamic controllable clutch ("DCC") in accordance with at least one embodiment of the present invention.
Figure 2:
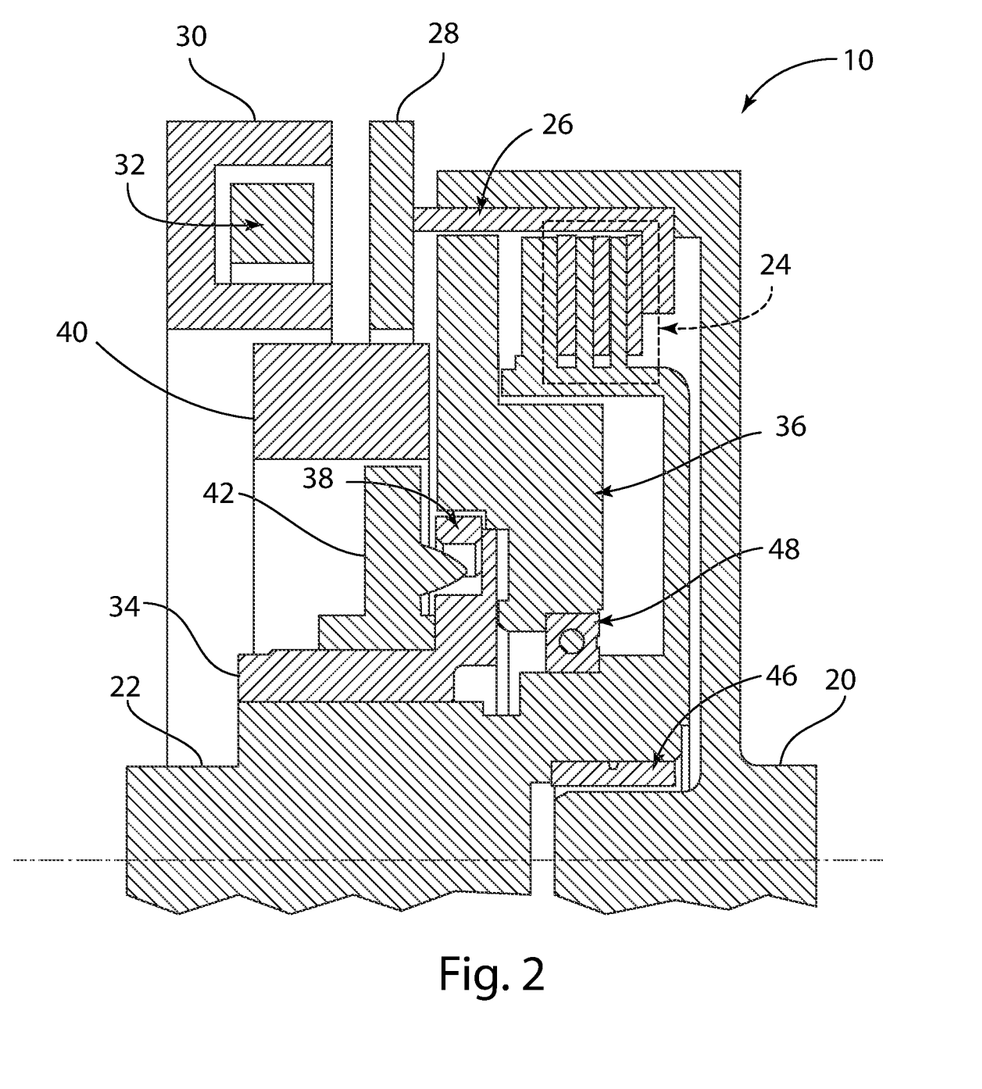
FIG. 2 illustrates a cross-sectional view of a one-quarter model of the clutch assembly.

Referring now to FIGS. 1 and 2, cross-sectional views of a one-half model and a one-quarter model, respectively, of a clutch assembly 10 in accordance with at least one embodiment of the present invention are shown. Clutch assembly 10 includes an electromagnetic friction clutch ("EFC") 12 and a dynamic controllable clutch ("DCC") 14.

Clutch assembly 10 is for use in a system having an input/output power flow component 20 and an output/input power flow component 22. For instance, power flow component 20 is an input power flow component in the form of a drive shaft and power flow component 22 is an output power flow component in the form of a driven shaft.

As will be explained, clutch assembly 10 is operable to connect power flow components 20 and 22 together whereby torque flow between the power flow components is enabled. More generally, clutch assembly 10 provides an electromagnetic actuation system for drive modules (e.g., power flow components 20 and 22) which require speed synchronization. Clutch assembly 10 consists of EFC 12 in conjunction with DCC 14. EFC 12, in conjunction with a set of spring-loaded, wet friction plates, is used for speed differential synchronization and to transfer the transient dynamic torque during the synchronization event. DCC 14, having a secondary linear electromagnetic actuator, is utilized to carry the steady-state torque once the system is fully synchronized. Clutch assembly 10 thus provides a dynamically controlled coupling assembly with electromagnetic synchronization system. That is, clutch assembly 10 provides a DCC with electromagnetic synchronization mechanism.

As both EFC 12 and DCC 14 are electromagnetically actuated, clutch assembly 10 is a fully electromagnetic actuation clutching system. Clutch assembly 10 is thus all electromagnetic and does not depend on a hydraulic actuator. Such an all-electric system that does not depend on hydraulic actuation can be smaller, lighter, cleaner, and faster in response time. Clutch assembly 10 also has the following advantages: engageable at high differential speeds using EFC 12; capable of delivering high static torque using 14 DCC; controllable and can thus provide a linear response for dynamic torque using electric current modulation; and does not require a continuous supply of electric power to stay engaged for torque delivery since the steady-state engagement can be made possible by a magnetic or mechanical latching mechanism.

Turning to FIG. 2, as indicated above, EFC 12 is an electromagnetic clutch which uses a friction surface to engage input and output members of the clutch and is derived based on the conversion of a hydraulically actuated, multi-plate, wet friction clutch into an electromagnetic actuation. EFC 12 includes a friction pack 24, a translator having a translator piston 26 and a translator plate 28, and a stator having a stator core 30 and a stator coil 32. Friction pack 24 includes friction plates which are connected to translator piston 26. The EFC stator is fixed in position and the EFC translator is movable relative thereto. The friction plates of friction pack 24 become compressed when the EFC translator (more particularly, translator piston 26) is moved toward the EFC stator.

DCC 14 includes a first coupling member in the form of a pocket plate 34 and a second coupling member in the form of a notch plate 36. Pocket plate 34 and notch plate 36 are supported for relative rotation to one another in first and second directions about a rotational axis. DCC 14 further includes one or more locking elements 38 (one shown). Locking element 38 is a radial locking element as shown in the drawings. Locking element 38 may be a strut. Locking element 38 is movable between (i) an engaged position in which the locking element extends out from a pocket of pocket plate 34 and engages a notch of notch plate 36 and (ii) a disengaged position in which the locking element does not extend from pocket plate 34 and does not engage notch plate 36. In the engaged position, the locking element mechanically couples pocket plate 34 and notch plate 36 together thereby preventing relative rotation of the pocket plate and the notch plate in at least one direction about the rotational axis.

For clutch assembly 10 being in use with the system having power flow components 20 and 22, pocket plate 34 is fixedly connected to power flow component 22 and notch plate 36 is fixedly connected to power flow component 20. Consequently, in the locked direction of rotation of DCC 14, torque can be transmitted between power flow components 20 and 22 via clutch assembly 10.

DCC 14 further includes an actuator having a stator 40 and a translator 42. DCC stator 40 is fixed in position.

DCC translator 42 is fixedly connected to pocket plate 34 to rotate therewith. DCC translator 42 is linearly movable between (i) an extended position in which a plunger of the DCC translator actuates locking element 38 into the engaged position and (ii) a retracted position in which the plunger of the DCC translator allows locking element 38 to move to the disengaged position.

Figure 3:
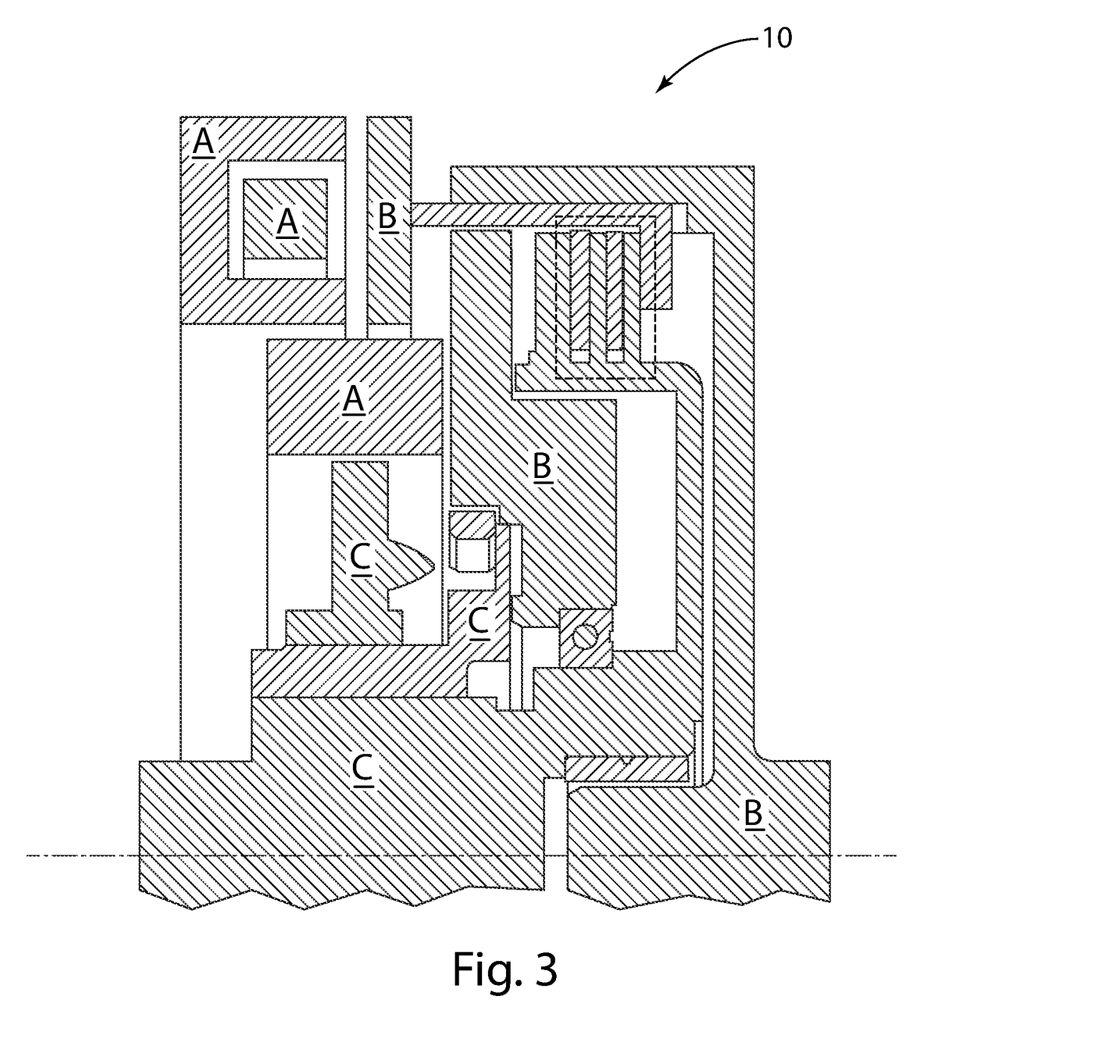
FIG. 3 illustrates the cross-sectional view of the one-quarter model of the clutch assembly and identifies rotatable and stationary components of the EFC and the DCC.

Referring now to FIG. 3, with continual reference to FIG. 2, the cross-sectional view of the one-quarter model of clutch assembly 10 with the rotatable and stationary components of EFC 12 and DCC 14 being categorized is shown. In FIG. 3, the components of EFC 12 and DCC 14 and power flow components 20 and 22 are categorized in arrangements with the label "A", "B", or "C". The system can be said to include the three arrangements A, B, and C which rotate relative to one another. Clutch assembly 10 includes first and second bearings 46 and 48 which facilitate motion of the components categorized as arrangements A, B, and C.

The components categorized as arrangements A, B, and C are shaded in FIG. 3 based on their angular velocities relative to each other. The components categorized as arrangement A remain stationary or grounded, such as by being fixed to a case or housing of the system. The components categorized as arrangement B are rotatable and will always rotate with the same angular velocity. The components categorized as arrangement C are also rotatable and will also always rotate with the same angular velocity. The components categorized as arrangements B and C will rotate with the same angular velocity when synchronized. That is, when the system is fully synchronized to speed differential of zero, the components of the system labeled with "B" and "C" will rotate with the same angular velocity. Likewise, until the system is fully synchronized, the components labeled with "B" may, and likely always will, rotate with a different angular velocity than the angular velocity of the components labeled with "C".

With comparison between FIGS. 2 and 3, arrangement A includes the EFC stator having EFC stator core 30 and EFC stator coil 32 and includes DCC stator 40. Accordingly, the stators of EFC 12 and DCC 14 are fixed in position. Arrangement B includes the EFC translator having EFC translator piston 26 and EFC translator plate 28 and includes DCC notch plate 36 and power flow component 20. Accordingly, power flow component 20, EFC translator plate/piston, and DCC notch plate 36 always rotate with the same angular velocity. Arrangement C includes DCC pocket plate 34, DCC locking element 38, DCC translator 42, and power flow component 22. Accordingly, DCC pocket plate 34, DCC locking element 38, DCC translator 42, and power flow component 22 always rotate with the same angular velocity. As indicated, when the system is fully synchronized to speed differential of zero, power flow component 20, EFC translator plate/piston, and DCC notch plate 36 and DCC pocket plate 34, DCC locking element 38, DCC translator 42, and power flow component 22 will rotate with the same angular velocity.

As described above, EFC friction pack 24 includes friction plates which are compressed when EFC translator piston 26 is moved towards the EFC stator. The friction plates are part of arrangement B. EFC friction pack 24 further includes pressure plates. The pressure plates are on power flow component 22 and therefore are part of arrangement C. EFC friction pack 24 thus comprises a combination of friction plates and pressure plates that slide axially through inner splines on arrangement B and outer splines on arrangement C. As shown in FIG. 3, the friction plates are part of arrangement B (i.e., they slide on splines on arrangement B) and the pressure plates are part of arrangement C (i.e., they slide on splines on arrangement C). Once the plates are compressed, the friction between the plates carries torque. Separator springs can be placed between the plates.

As discussed with respect to FIGS. 2 and 3, the components of arrangement B are all connected such that they will always rotate with the same angular velocity as each other. Likewise, the components of arrangement C are also interconnected such that they will always rotate with the same angular velocity as each other.

The components of the arrangements B and C, however, will not always rotate with the same angular velocity. However, when the system is fully synchronized to speed differential of zero, components of the arrangement B and arrangement C will rotate with the same, or virtually the same, angular velocity. The synchronization process is described with respect to FIG. 4.

Figure 4:
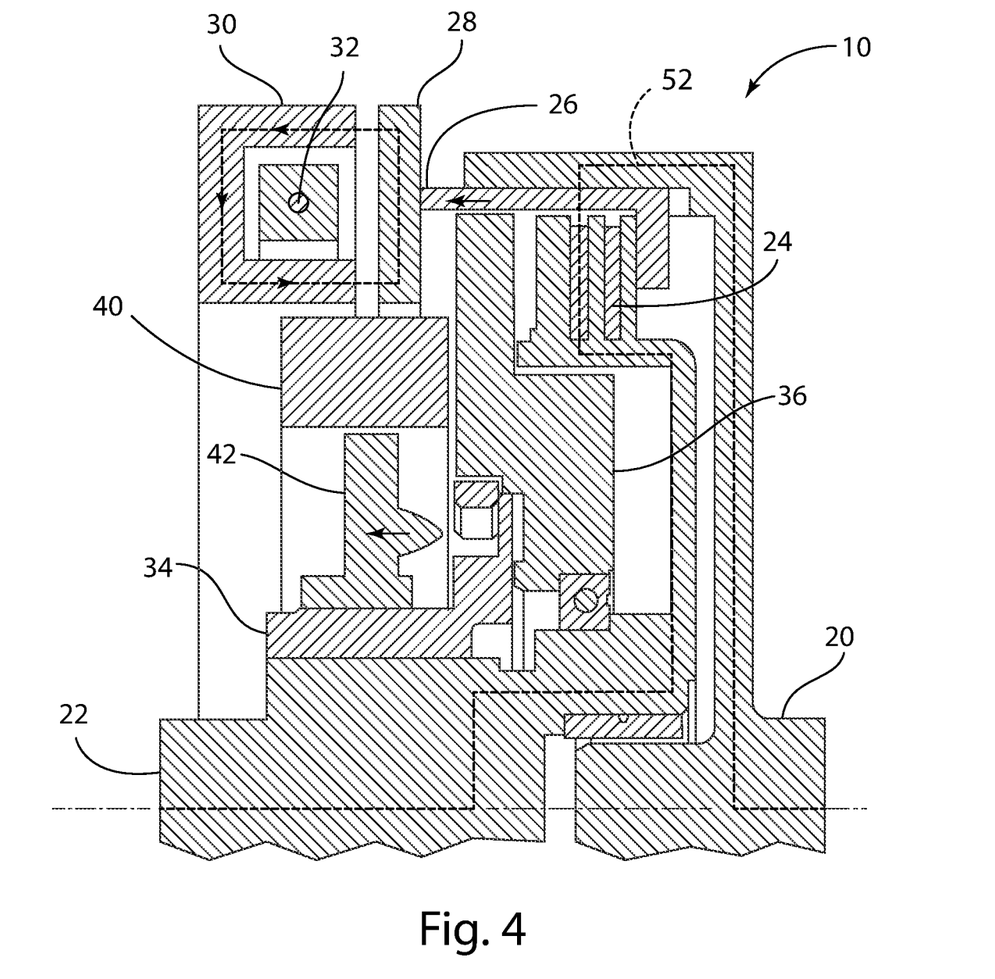
FIG. 4 illustrates the cross-sectional view of the one-quarter model of the clutch assembly and identifies speed synchronization events and a power flow path during speed synchronization operation of the EFC.

Referring now to FIG. 4, with continual reference to FIGS. 2 and 3, the cross-sectional view of the one-quarter model of clutch assembly 10 with speed synchronization events and a power flow path during speed synchronization operation of EFC 12 being identified is shown. Initially, the arrows in FIG. 4 indicate the direction of the motion of the EFC and DCC translators (i.e., the direction of the motion of EFC translator plate and piston 28 and 26 and the direction of motion of DCC translator 42) during the speed synchronization operation.

As shown in FIG. 4, the speed synchronization operation begins with DCC translator 42 being positioned by DCC stator 40 in the retracted position. Electrical current is then provided through EFC stator coil 32 which generates a magnetic loop 50 (indicated in FIG. 4 by the broken line with arrow heads) through EFC stator core 30 and EFC translator plate 28. Magnetic loop 50 creates an attraction force between EFC stator core 30 and EFC translator plate 28 which thereby pulls EFC translator piston 6 toward EFC stator core 30. EFC translator piston 6 being moved along with EFC translator plate 28 towards EFC stator core 30 causes the friction plates of EFC friction pack 24 to be compressed. The compressed friction plates of EFC friction pack 24 engage the pressure plates of the EFC friction pack whereby these plates carry torque. Consequently, a power flow path 52 (indicated in FIG. 4 by the broken line with relatively large line segments) is formed through power flow component 22, EFC friction pack 24, and power flow component 20. Power flow path 52 synchronizes the angular velocities of DCC pocket plate 34 and DCC notch plate 36.

As described, during the speed synchronization operation, EFC translator piston 26 exerts force on EFC friction pack 24 thereby compressing the plates of the EFC friction pack together. EFC friction pack 24 carries the dynamic torque between power flow components 20 and 22 during the speed synchronization operation.

At the end stage of the speed synchronization operation, the angular velocities of DCC pocket plate 34 and DCC notch plate 36 are synchronized. That is, DCC pocket plate 34 and DCC notch plate 36 are rotating with the same angular velocity. DCC pocket plate 34 and DCC notch plate 36 can therefore be engaged with one another to thereby enable torque to be transmitted between power flow components 20 and 22 via the engaged DCC pocket plate 34 and DCC notch plate 36.

Figure 5:
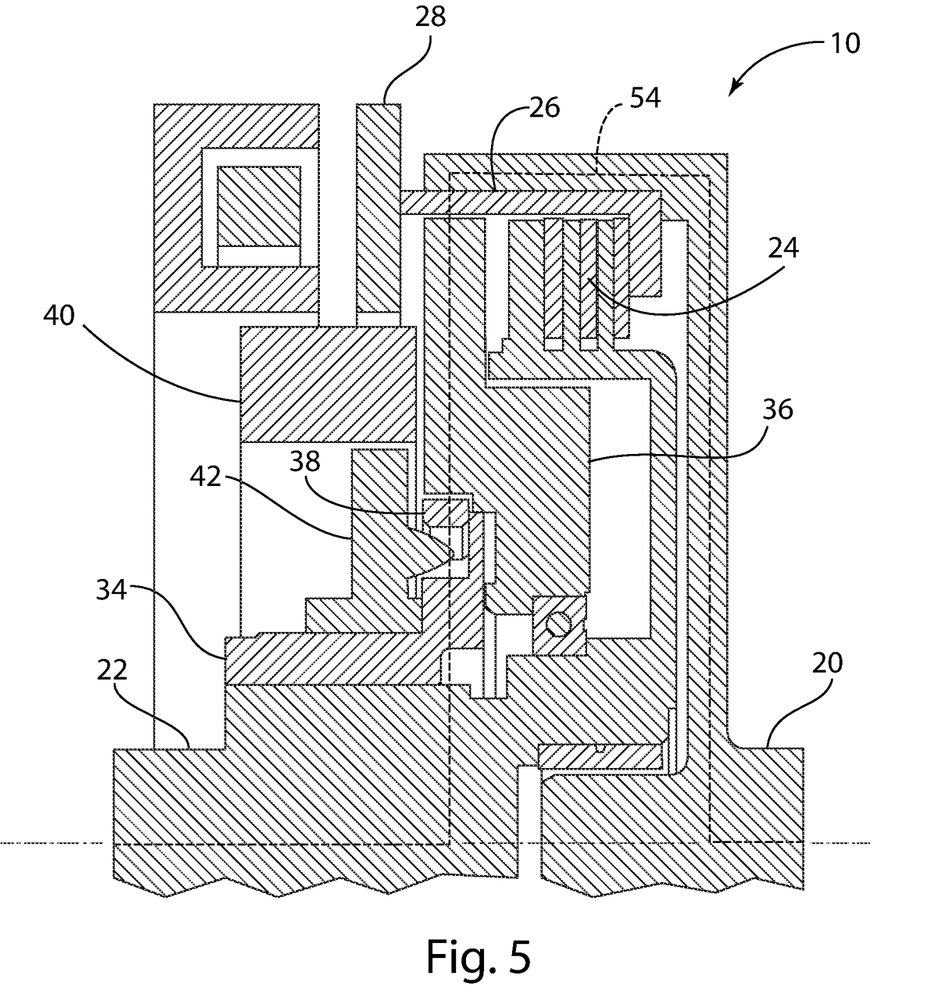
FIG. 5 illustrates the cross-sectional view of the one-quarter model of the clutch assembly and identifies engagement events and a power flow path during engagement operation of the DCC.

Referring now to FIG. 5, with continual reference to FIGS. 2, 3, and 4, the cross-sectional view of the one-quarter model of clutch assembly 10 with DCC engagement events and a power flow path during engagement operation of DCC 14 is shown. Initially, the arrows in FIG. 5 indicate the direction of the motion of the EFC and DCC translators (i.e., the direction of the motion of EFC translator plate and piston 28 and 26 and the direction of motion of DCC translator 42) during the engagement operation.

As noted, at the end of the synchronization operation, the angular velocities of DCC pocket plate 34 and DCC notch plate 36 are synchronized. As shown in FIG. 5, the engagement operation then begins with DCC translator 42 being positioned by DCC stator 40 in the extended position. Consequently, with DCC translator 42 being in its extended position, the plunger of DCC translator 42 actuates DCC locking element 38 into its engaged position in which the DCC locking element 38 couples DCC pocket plate 34 and DCC notch plate 36 together. The electrical current through EFC stator coil 32 is turned off and magnetic loop 50 attracting EFC translator plate 28 towards EFC stator core 30 thereby disappears. EFC translator piston 26, with EFC translator plate 28 attached thereto, is pulled back away from EFC stator core by the separator springs (not shown) separating the friction and pressure plates of EFC friction pack 24 thereby disengaging EFC friction pack 24 (that is, disengaging the friction plates and the pressure plates). EFC friction pack 24 is thereby uncompressed by the separator springs and does not carry torque. As a result of (i) DCC pocket plate 34 and DCC notch plate 36 being engaged and (ii) EFC friction pack 24 being uncompressed, a power flow path 54 (indicated in FIG. 5 by the broken line with relatively large line segments) is formed through power flow component 22, DCC pocket plate 34, DCC locking element 38, DCC notch plate 36, and power flow component 20. Power flow path 54 carries the steady-state torque of the system.

As described, clutch assembly 10 is an electromagnetic actuation clutch assembly which can be used for any system which requires two stage clutching with temporary speed synchronization and long-term steady-state torque delivery with no hydraulic pressure or constant electric power required. In other embodiments, clutch assembly 10 may be designed to combine the two independent actuators (i.e., the EFC and the DCC) into a single actuator, thereby resulting in a single, three-position actuator.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A clutch assembly comprising:
    a first rotatable component;
    a second rotatable component;
    a first clutch having a first clutch translator and a friction pack, the friction pack including a first plate fixed to the first rotatable component and a second plate fixed to the second rotatable component; the first clutch translator, the second plate, and the second rotatable component always rotating at the same angular velocity;
    a second clutch having a first coupling member fixed to and rotating with the first rotatable component and a second coupling member fixed to and rotating with the second rotatable component, a locking element rotating with the first coupling member, and a linear actuator including a stationary stator and a second clutch translator, the second clutch translator and first rotatable component always rotating at the same angular velocity;
    the first clutch translator movable to an actuated position in which the plates of the friction pack engage one another thereby synchronizing angular velocities of the first and second rotatable components without causing a power path extending and transmitting torque through either of the first and second coupling members; and
    the second clutch translator movable to an extended position in which the locking element engages the first and second coupling members with one another thereby causing a second clutch power path through the first and second coupling members.

2. The clutch assembly of claim 1 wherein:
    the second clutch translator is movable to the extended position upon the angular velocities of the first and second coupling members being synchronized.

3. The clutch assembly of claim 2 wherein:
the first clutch translator includes an unactuated position in which the plates of the friction pack are disengaged with one another; and
the first clutch translator movable to the unactuated position upon the second clutch translator being moved to the extended position.

4. The clutch assembly of claim 1 wherein:
the second clutch translator is movable to a retracted position in which the locking element does not engage the first and second coupling members with one another whereby the second clutch power path is absent; and
the second clutch translator is movable to the retracted position while the angular velocities of the first and second coupling members are not synchronized.

5. The clutch assembly of claim 1 wherein:
a first clutch power path extends through the friction pack while the plates of the friction pack are engaged, the first clutch power path carrying torque while the angular velocities of the first and second coupling members are being synchronized.

6. The clutch assembly of claim 1 wherein:
the second clutch power path carries torque between the first and second coupling members after the angular velocities of the first and second coupling members have been synchronized.

7. The clutch assembly of claim 1 wherein:
the first clutch translator is operable to move to the actuated position; and
the second clutch translator is operable to move to the extended position.

8. The clutch assembly of claim 1 further comprising:
a first actuator operable with the first clutch translator for enabling the first clutch translator to move between the actuated position and an unactuated position; and
an actuator operable with the second clutch translator for enabling the second clutch translator to move between the extended position and a retracted position.

9. The clutch assembly of claim 1 wherein:
the first clutch is an electromagnetic friction clutch (EFC); and
the second clutch is a dynamic controllable clutch (DCC).

10. A system comprising:
a first shaft and a second shaft having a common axis of rotation;
first and second rotatable components, the first rotatable component fixed to the first shaft and the second rotatable component fixed to the second shaft;
a clutch assembly including a first clutch and a second clutch;
the first clutch having a first stationary stator, a first clutch translator and a friction pack, the friction pack including a first plate fixed to the first rotatable component and a second plate fixed to the second rotatable component, the first clutch translator always rotating at the same angular velocity as the first rotatable component;
the second clutch having first and second coupling members, a locking element, a second stationary stator, and a second clutch translator, the first coupling member fixed to the second rotatable component and the second coupling member fixed to the first rotatable component, the second clutch translator always rotating at the same angular velocity as the second rotatable component;
the first stationary stator positioning the first clutch translator in an actuated position in which the plates of the friction pack are engaged with one another thereby causing a first clutch power path through the first rotatable component, the friction pack, and the second rotatable component, the first clutch power path excludes the first coupling member, and angular velocities of the first and second coupling members to be synchronized; and
the second stationary stator positioning the second clutch translator in an extended position in which the locking element engages the first and second coupling members with one another thereby causing a second clutch power path through the second rotatable component, the first coupling member, the second coupling member, and the first rotatable component.

11. The system of claim 10 wherein:
the second clutch translator is movable to the extended position upon the angular velocities of the first and second coupling members being synchronized.

12. The system of claim 10 wherein:
the first clutch translator is movable to an unactuated position in which the plates of the friction pack are disengaged with one another whereby the first clutch power path is absent; and
the first clutch translator movable to the unactuated position upon the second clutch translator being moved to the extended position.

13. The system of claim 10 wherein:
the second clutch translator is movable to a retracted position in which the locking element does not engage the first and second coupling members with one another whereby the second clutch power path is absent; and
the second clutch translator is movable to the retracted position while the angular velocities of the first and second coupling members are not synchronized.

14. The system of claim 10 wherein:
the first clutch power path is for carrying dynamic torque between the first and second rotatable components while the angular velocities of the first and second coupling members are being synchronized.

15. The system of claim 10 wherein:
the second clutch power path carries torque between the first and second rotatable components after the angular velocities of the first and second coupling members have been synchronized.

16. The system of claim 10 wherein:
the first clutch translator is operable to move to the actuated position; and
the second clutch translator of the second clutch is operable to move to the extended position.

17. The system of claim 10 further comprising:
a first actuator operable with the first clutch translator enabling the first clutch translator to move between the actuated position and an unactuated position; and
a linear actuator operable with the second clutch translator enabling the second clutch translator to move between the extended position and a retracted position.

18. The system of claim 10 wherein:
the first clutch is an electromagnetic friction clutch (EFC); and
the second clutch is a dynamic controllable clutch (DCC).

19. A clutch assembly comprising:
a housing;
a first rotatable component;
a second rotatable component;
the first rotatable component and the second rotatable component rotating about a common axis;
a first clutch having a first clutch stator, a first clutch translator and a friction pack, the friction pack including a first plate directly connected to the first rotatable component and a second plate directly connected to the second rotatable component, the first clutch stator fixed to the housing, the first clutch translator and the first rotatable component always rotate at the same angular velocity;

a second clutch having first and second coupling members, a locking element, and a second clutch stator, and a second clutch translator, the first coupling member fixedly connected to the second rotatable component and the second coupling member fixedly connected to the first rotatable component, the second clutch stator fixed to the housing, the second clutch translator and the second rotatable component always rotate at the same angular velocity;

the first clutch translator movable to an actuated position in which the plates of the friction pack are engaged with one another thereby causing angular velocities of the first and second coupling members to be synchronized; and the second clutch translator is positioned by the second clutch stator in an extended position in which the locking element engages the first and second coupling members with one another thereby causing a power flow path through the first and second coupling members.

20. A clutch assembly comprising:

a first clutch having a first stator, a first translator, and a friction pack;

a second clutch having first and second rotatable coupling members, a locking element, a second stator separate from the first and second rotatable coupling members, the second stator stationary and nonrotatable, and a second translator connected to and rotating at the same angular velocity as the first rotatable coupling member;

the friction pack including a first plate directly connected to the first rotatable coupling member and a second plate directly connected to the second rotatable coupling member, the first translator of the first clutch connected to and rotating at the same angular velocity as the second rotatable coupling member;

the first stator positioning the first translator of the first clutch in an actuated position in which the plates of the friction pack are engaged with one another thereby causing angular velocities of the first and second rotatable coupling members to be synchronized; and the second stator positioning the second translator of the second clutch in an extended position in which the locking element engages the first and second rotatable coupling members with one another thereby causing a power flow path through the first and second rotatable coupling members.

* * * * *